United States Patent [19]

Angiolillo-Bent et al.

[11] Patent Number: 4,995,075
[45] Date of Patent: Feb. 19, 1991

[54] APPARATUS AND METHOD FOR ENCODING TELEPHONE RINGING SIGNALS

[75] Inventors: Joel S. Angiolillo-Bent, Freehold; Linda A. Roberts, Sea Bright, both of N.J.

[73] Assignee: AT&T Bell Laboratories, Murray Hill, N.J.

[21] Appl. No.: 402,401

[22] Filed: Sep. 5, 1989

[51] Int. Cl.$^5$ .................. H04M 3/02; H04M 3/42
[52] U.S. Cl. .................. 379/142; 379/253; 379/375
[58] Field of Search .............. 379/374, 375, 142, 253, 379/252

[56] References Cited

U.S. PATENT DOCUMENTS 4,477,697 10/1984 Judd et al. .................. 379/375
4,720,848 1/1988 Akiyama .................. 379/88

FOREIGN PATENT DOCUMENTS 0288541 12/1986 Japan .................. 379/142

Primary Examiner—Thomas W. Brown
Attorney, Agent, or Firm—Samuel R. Williamson

[57] ABSTRACT

An encoded telephone signalling apparatus and method provides pleasant, relatively distinct and quickly distinguishable personalized call destination information and distinctive call origin information signals within an audible ringing pattern. The ring pattern or envelope is partitioned into two segments, the first segment providing call destination and identifying which party should answer the call, the second segment providing call origin information. The second segment contains information such as, for example, whether the call is an inside call (intercom), an outside call (central office), or a priority call. Within the first segment, call destination information is encoded in a melodic contour pattern. Within the second segment, call origin information is encoded by varying the number of pulses obtained from a single frequency audio signal which is syncopated to the melodic contour pattern provided by different audio frequencies in the first segment.

22 Claims, 4 Drawing Sheets

APPARATUS AND METHOD FOR ENCODING TELEPHONE RINGING SIGNALS

BACKGROUND OF THE INVENTION

1. Technical Field

This invention relates to ring signaling and more particularly, to an apparatus and method for encoding telephone ringing signals.

2. Description of the Prior Art

Telephone users often find it desirable to have information about the origin and destination of a received call prior to the call being answered. Because the telephone user may not be near a telephone, the use of visual signaling may not provide the information desired. Some telephone communication systems now provide users with distinctive ringing signals which identify whether the received call is an external (central office) call or an internal (intercom) call. Additional information, such as the priority of an internal call, is also incorporated into this distinctive ringing signal format.

In other telephone communication systems, users are provided with call destination information using a personalized ringing signal. Personalized ringing enables each user to determine whether he or she is the intended recipient of an incoming call by listening to and decoding the ring signal. These distinctive and/or personalized ringing features are provided in communication systems using a coded ringing signal.

In certain applications, telephone users desire both the distinctive and personalized ringing features in a telephone communication system. A coded ringing circuit providing both of these features is disclosed in U.S. Pat. No. 4,477,697, issued to T. H. Judd et al. on Oct. 16, 1984. The ring pattern in this ringing circuit is partitioned into two segments with the first segment providing a distinctive ring signal and the second segment providing a personalized ring signal. While the coded ringing circuit has been satisfactory in providing both features, it is nevertheless desirable to provide an improved ring pattern.

SUMMARY OF THE INVENTION

In accordance with the invention, an encoded telephone signaling apparatus and method provides pleasant, relatively distinct and quickly distinguishable personalized (call destination information) and distinctive (call origin information) signals within the same audible ringing pattern. The ring pattern or envelope is partitioned into two segments. The first segment provides the call destination information and identifies which party should answer the call. The second segment provides the call origin information. This second segment contains information such as, for example, whether the call is an inside call (intercom), an outside call (central office), or a priority call. Within the first segment, call destination information is encoded by time division multiplexing different audio frequencies into fixed subsegments interrelated as part of a melodic contour pattern. Within the second segment, call origin information is encoded by varying the number of pulses obtained from a single frequency audio signal. This single frequency audio signal is syncopated to the melodic contour pattern provided by the different audio frequencies in the first segment. No signal is present in the time period between pulses during this second segment.

In an illustrative embodiment, a common control module of a communication system transmits the call destination and origin information of a ringing signal in a coded digital format to a called station. Circuitry within the called station receives and decodes this coded digital ringing signal into an analog composite ringing signal having appropriate prefix and suffix segments. In the illustrative embodiment, the prefix segment is 800 milliseconds (MS) long and is divided into eight 100 MS intervals while the suffix segment is 800 MS long and is divided into eight 100 MS intervals. A programmable tone generator is selectively enabled and frequency programmed during the appropriate time intervals to generate the composite ringing signal. This ringing signal is provided to a transducer which audibly outputs the desired coded ringing signal.

BRIEF DESCRIPTION OF THE DRAWING

This invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
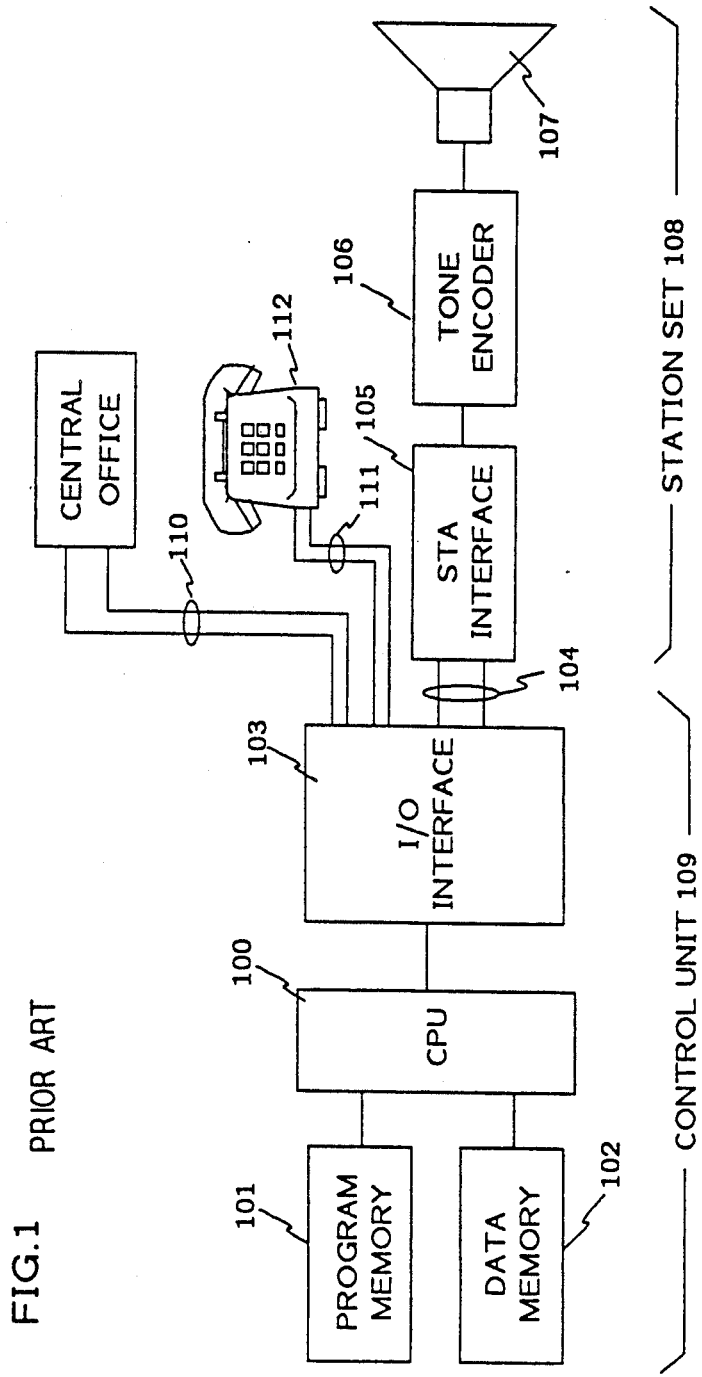
FIG. 1 is a simplified block diagram of a telephone communication system employing the invention.

With reference to FIG. 1, there is shown a simplified block diagram of a telephone communication system for incorporating the present invention. The system includes a common control unit 109 which connects to one or more central office lines, such as 110, and which connects to two or more station sets, such as 108 and 112, via facilities 104 and 111, respectively. Control unit 109 establishes and controls all intercom and central office line communications. Program memory 101 provides instructions to central processor unit (CPU) 100 for controlling the various operating features and functions of the system. Data memory 102 is utilized by the CPU for storing and accessing data associated with performing the various functions and features programmed in program memory 101. In the illustrated embodiment CPU 100 is a microprocessor, program memory 101 is read-only-memory (ROM) and data memory 102 is a combination of both random access memory (RAM) and electrical erasable programmable read-only memory (EEPROM). The input/output interface circuit 103 contains the well-known switching, network control, and line circuits required by the system to establish, maintain and terminate communications.

Station set 108 includes an interface 105, tone encoder 106, and speaker 107. The telephone handset and other well-known apparatus and circuits of station set 108 are part of interface 105 and operate in a conventional manner. Interface 105 also conditions the signals sent to and received from facility 104 for use with tone encoder 106. Toner encoder 106 includes circuitry for converting binary (digital) ring data words received from common control unit 109 into a ringing signal which has been encoded with call destination and call origin information. The speaker 107 audibly outputs the encoded ring signal to the user.

Control unit 109 is programmed in a straightforward manner to periodically generate binary ring data words for transmission to a station set in the ringing mode. The data utilized to form ring words consists of data which is preprogrammed into program memory 101, programmed by the user into data memory 102, or determined by CPU 100 according to call characteristics. By way of example, user programming could determine the assignment of call destination (prefix) codes and the CPU 100 could determine the call origin (suffix) information, which is reflective of whether the call is an intercom, central office, transfer or high priority call. Under program control, control unit 109 collects the various data from tables, memory locations, and/or registers and formats the data into the ring data word for transmission to the appropriate station set. While the invention as disclosed is directed to telephone communication systems, it is contemplated that the present invention can be implemented in a similar manner to convey information in other varieties of signaling systems.

Figure 2:
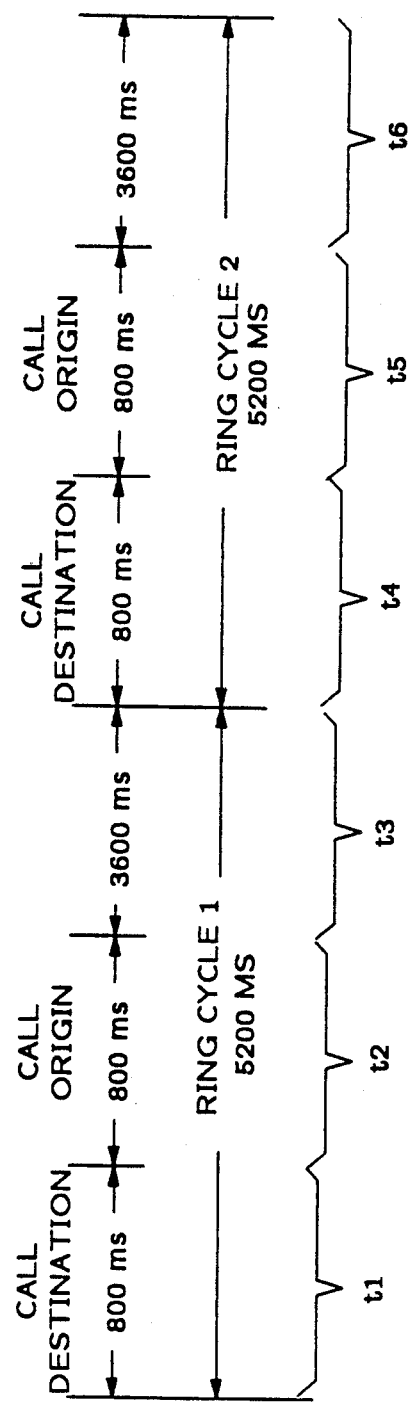
FIG. 2 shows multiple ring cycles of an encoded ringing signal in accordance with the invention.

Referring now to FIG. 2, there is shown a first and a second ring cycle (t1–t3, t4–t6) of the analog composite ringing signal generated using the apparatus and method of the present invention. In accordance with the invention, call destination information is provided in a prefix segment (t1) of an active ring period (t1,t2) of a ring cycle and call origin information is provided in a suffix segment (t2) of the active ring period of the ring cycle.

As illustrated in FIG. 2, the ring cycle (t1,t2,t3) is 5200 MS and includes the active ring period (t1,t2) of 1600 MS and a quiescent period (t3) of 3600 MS. While the time intervals illustrated in FIG. 2 are the approximate preferred values, the operation and utilization of the present invention, without deviating from the spirit or scope thereof, may be adapted to provide other time intervals for the active, i.e., prefix and suffix, and quiescent portions of a ring cycle.

Figure 3:
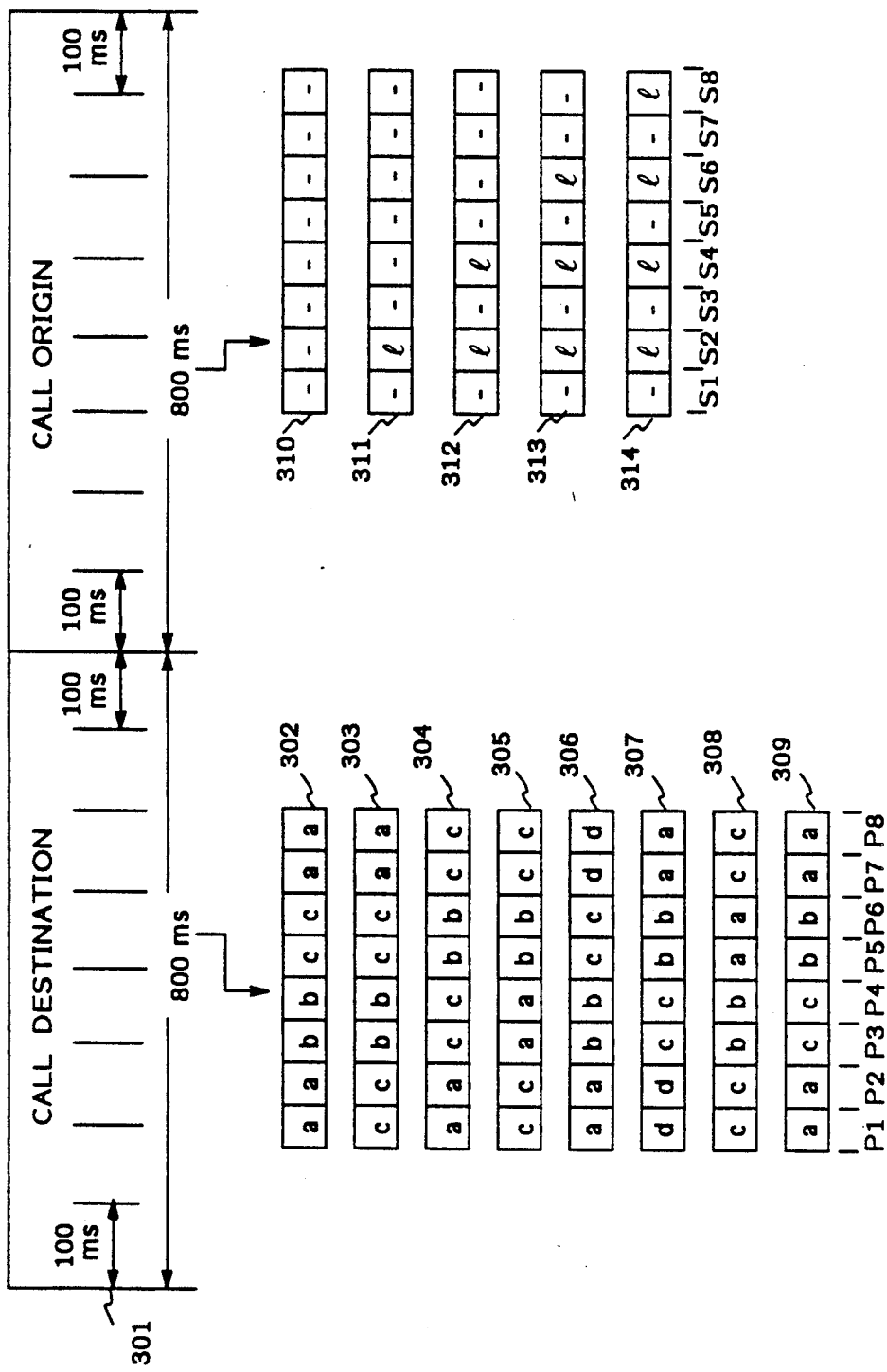
FIG. 3 shows a repertoire of encoded ringing signal segments and subsegments in accordance with the invention.

Referring next to FIG. 3, there is shown a repertoire of selectable active portions of the ring cycles illustrated in FIG. 2. Active portion 301 shows the prefix and suffix segment representations, i.e., the active ring period, of a ring cycle. The prefix segment is 800 MS long and is divided into eight 100 MS subsegments while the suffix segment is 800 MS long and is similarly divided into eight 100 MS subsegments.

In the prefix segment representations 302 through 309, each 100 MS time interval designated as P1–P8 is occupied by an (a), (b) or (c) character. Each of these characters is representative of a selected frequency tone with the primary selection requirements being that (a) be lower in frequency than (b) and, similarly, (b) be lower in frequency than (c). The frequency tones selected are melodic contours wherein the prefix patterns reflective of the call destinations differ by their "ups" and "downs". The melodic contours are significantly more distinctive and also pleasing when a relatively small difference exists between the selected frequency tones of the melodies. As shown in the prefix segment representations 302 through 309, each character representative of a frequency tone occupies two consecutive 100 MS time intervals. The melodic contour for each of the prefix segment representations 302 through 309 are thus provided as four-note melodies. In the embodiment, frequencies that are illustratively associated with characters (a), (b), (c) and (d) are respectively 698 Hz, 784 Hz, 880 Hz and 1046 Hz.

In the suffix segment representations 310 through 314, each 100 MS time interval designated as S1–S8 is represented either by an (e) or (-) character. The occurrence of the (e) character in designated 100 MS time intervals is reflective of the call origin and represents a frequency tone that is selected to be musically related to the preceding melodic contour tones. This call origin tone is provided in a syncopated simple suffix pattern. This tone is syncopated in the sense that it occurs on the up-beat of the rhythm that is established by the personalized melody provided in the call destination tones. It is a simple pattern in the sense that only rhythm is varied and not the length of the tones. For optimal recognition, the call origin tone is musically related, e.g., a scale note contained in the scale of the melody of the personalized pattern. In the embodiment, a frequency that is illustratively associated with character (e) is 932 Hz. The (-) character shown in the suffix segment representations 310 through 314 reflects the absence of a tone in the corresponding subsegments.

Prefix segment representations 302–309, show eight codes which can be used in providing destination information in the prefix segment of an analog composite ringing signal. And suffix segment representations 310–314 show five codes which can be used in providing origin information in the ringing signal. The composite ringing signal is thus comprised of one code from the prefix segment and one code from the suffix segment, each code being selected according to the destination and origin information that is provided.

As indicated, the prefix segment signal identifies which parties should answer the telephone call. The prefix segment signal is comprised of fixed subsegments of 100 MS, each of which can contain one of four frequency tones (a), (b), (c) and (d). The code for one party is shown in the prefix segment representation 302 and includes 200 MS of the (a) frequency tone followed by 200 MS of the (b) frequency tone followed by 200 MS of the (c) frequency tone and ended by 200 MS of the (a) frequency tone for the prefix segment. Similarly, frequency segment representations 303 through 309 illustrate other tone code combinations for up to eight parties using the (a), (b), (c) and (d) frequency tones.

When no called party identification is provided the telephone station may be programmed to ring in a conventional manner using either of the above combination of frequency tones as the default code. This frequency tone will be provided throughout the call destination segment of the ringing signal. Alternatively, a single frequency or a frequency modulated tone code may be provided throughout the call destination sequence of the ringing signal. Call origin information will, in this instance, continue to be presented as described herein.

The suffix segment signal is comprised of an (e) tone whose pulses vary in number. As noted, the suffix segment signal identifies an incoming call as being a priority, transfer outside, or inside telephone call. A ring signal for an inside (e.g., intercom) telephone call as shown in suffix segment representation 310 comprises an 800 MS absence of tone in time slots S1 through S8 of the suffix segment. An outside telephone call as shown in suffix segment representation 311 includes a 100 MS absence of tone in slot S1, followed by a 100 MS (e) frequency tone in slot S2 and then 600 MS absence of tone in slots S3 through S8 of the suffix segment. A ring signal for a transfer telephone call is shown in suffix segment representation 312 and includes a 100 MS absence of tone in slot S1 followed by a 100 MS (e) frequency tone in slot S2, followed by a 100 MS absence of tone in slot S3, followed by a 100 MS (e) frequency tone in slot S4 and then 400 MS absence of tone in slots S5 through S8 of the suffix segment. A ring signal for a priority telephone call is shown in suffix segment representation 313 and includes a 100 MS absence of tone in slot S1 followed by a 100 MS (e) frequency tone in slot S2, followed by a 100 MS absence of tone in slot S3, followed by a 100 MS (e) frequency tone in slot S4, followed by a 100 MS absence of tone in slot S5, followed by a 100 MS (e) frequency tone in slot S6 and then 200 MS absence of tone in slots S7 and S8 of the suffix segment.

Yet another optional ring signal for a telephone call is shown in suffix segment representation 314. This ring signal differs from the ring signal for a priority call in that slot S8 also includes a 100 MS (e) frequency tone. This is an optional user programmable suffix ring pattern that will provide additional information about the origin of the call. For example, a user desirous of being alerted when a call from a particular party is received may program his or her telephone station to ring with this suffix ring pattern. This is achievable in some telephone communication systems such as an integrated services digital network (ISDN system wherein the calling number identification is provided along with the incoming ring signal.

Figure 4:
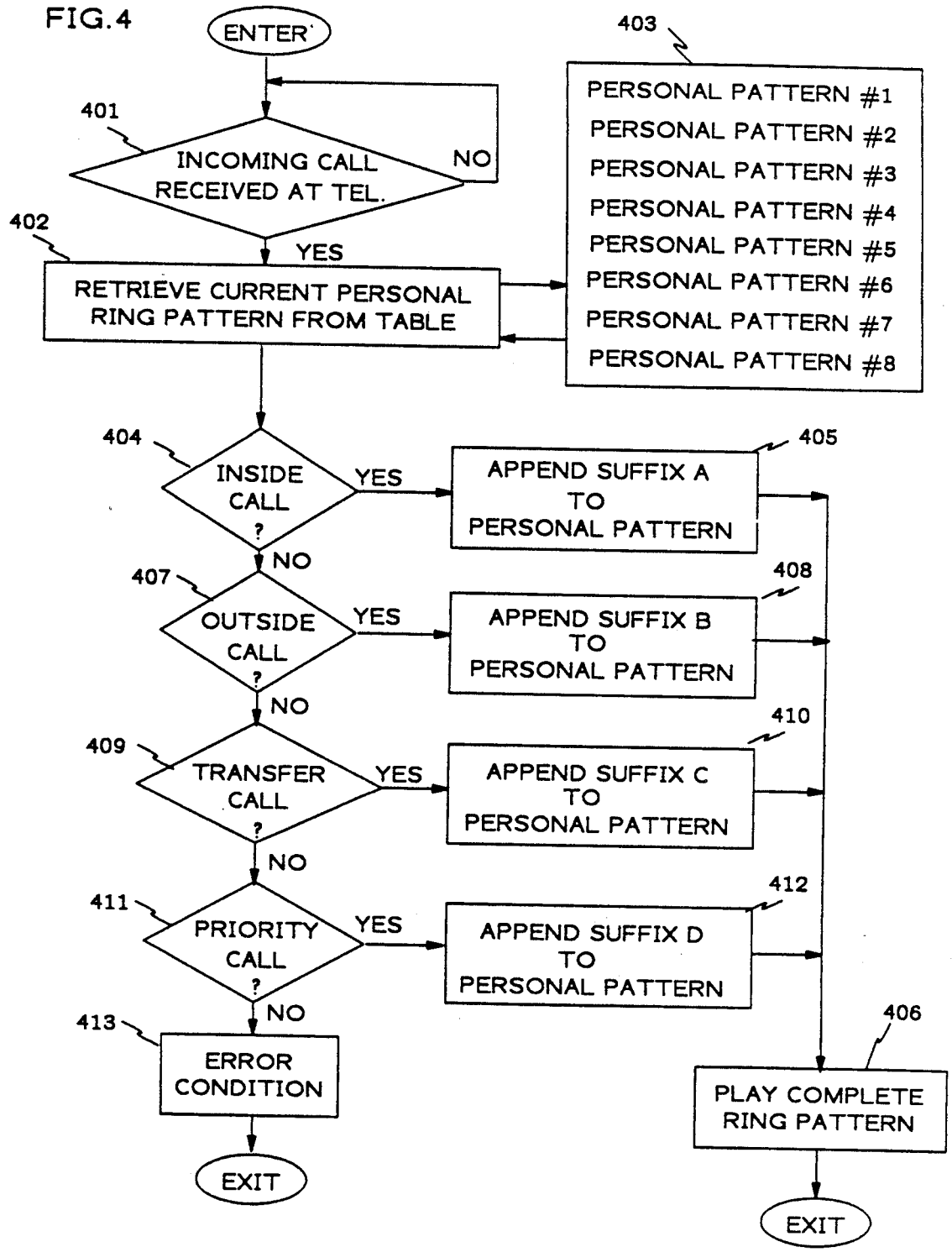
FIG. 4 shows a flow chart disclosing the method of encoding ringing signals in accordance with the invention.

Referring next to FIG. 4, there is shown a flow chart illustrating the operation of the telephone communication system in providing the encoded telephone ringing signals. The functions provided by CPU 109 are advantageously determined by a process or program stored in memory 101.

The process is entered at decision 401 where it is determined whether an incoming or intercom call has been received by the telephone communication system. If a call has not been received, the process remains at decision 401 awaiting the arrival of a call. If a call has been received, the process advances to step 402 where a personal ring pattern corresponding to a particular station set in the communication system is retrieved from a memory bank or table depicted in step 403. This memory bank or table is convently located in data memory 102.

The personal ring pattern selected may be one of eight different patterns previously selected by the user. In the absence of the user a telephone selecting a pattern, personal pattern number 1 may serve as the default pattern and provisions for such are easily provided.

Once the current personal ring pattern has been retrieved from the table, the process advances to step 404 where a determination is made as to whether the call is an intercom call, i.e., originated inside the communication system. If so, the process advances to step 405 where suffix A is appended to the personal pattern. Since suffix A, as represented by the suffix segment representation 310 shown in FIG. 3, has a pattern without tones, no tones are appended to the personal ring pattern in this instance. The process next advances to step 406 where the ring pattern is acoustically outputted at the appropriate station set. The process is then exited.

Referring once again to decision 404, if it is determined at this decision that the call is not an inside call, the process advances to decision 407 where a decision is made as to whether the call is an outside call, e.g., received from a central office. If so, similar to the previous step, an appropriate suffix, in this instance suffix B, is appended to the personal pattern at step 408 and the complete pattern is acoustically outputted at the appropriate station set. A transfer call is similarly processed by decision 409 and step 410 with suffix C being appended to the personal ring pattern. A priority call is likewise processed by decision 411 and step 412 with a suffix D added to its personal pattern. If after considering decisions 404, 407, 409 411 and 413, the process fails to find an appropriate suffix match for the data then being considered, it assumes an error condition in step 413 and the process is exited.

Various other modifications of this invention are contemplated and may obviously be resorted to by those skilled in the art without departing from the spirit and scope of the invention as hereinafter defined by the appended claims.

We claim:

1. A communication system including a control unit and a plurality of stations connected thereto, each station having a capability of communicating with other stations in the system, said system comprising:
   means for dividing an active ring interval of an audible ringing signal into a first and a second segment;
   means for generating during said first segment one of multiple groups of first encoded audible tone signals arranged in a melodic contour pattern, each group providing information for specifying the destination of a received call; and
   means for generating during said second segment one of a group of second encoded audible tone signals, each signal of the group providing information for specifying the origin of the received call.

2. The communication system as in claim 1 wherein each of the first encoded audible tone signals comprises a pulse of one of multiple frequency audible tone signals, each of said tone signals having a common pulse width.

3. The communication system as in claim 1 wherein each one of the group of second encoded audible tone signals is syncopated to the melodic contour pattern.

4. The communication system as in claim 3 wherein each of the second encoded audible tone signals comprises at least one of multiple pulses of a single frequency audible tone signal, each tone signal having a common pulse width.

5. The communication system as in claim 1 wherein the means for generating the second encoded audible tone signals further includes means for generating said signals such that each signal has a unique number of pulses of a single frequency.

6. The communication system as in claim 5 further comprising means for dividing the second segment into multiple subsegments and for including the number of pulses of a second encoded audible tone signal in selected subsegments and no signal in nonselected subsegments.

7. The communication system as in claim 6 wherein the control unit includes means for transmitting an encoded ringing signal specifying the audible tone signals to be generated at a station, and the station includes means for receiving said encoded ringing signal and for generating said audible tone signals.

8. A communication system including a control unit and a plurality of station sets connected thereto, each station having a capability of communicating with other stations in the system, said system comprising:

means for dividing an active ring interval of an audible ringing signal into a first and a second segment;

means for generating during said first segment one of multiple groups of first encoded audible tone signals, each group being arranged in a melodic contour pattern for providing information of a first type about a received call; and means for generating during said second segment one of a group of second encoded audible tone signals, each signal of the group being syncopated to the melodic contour pattern for providing information of a second type about the received call.

9. The communication system as in claim 8 wherein said first type of information specifies the destination of said received call.

10. The communication system as in claim 8 wherein said second type of information specifies the origin of said received call.

11. The communication system as in claim 8 wherein said second type of information specifies the priority of said received call.

12. A method of encoding an audible ringing signal of a communication system, said method comprising the steps of:

dividing an active ring interval of an audible ringing signal into a first and a second segment;

generating during said first segment one of multiple groups of first encoded audible tone signals arranged in a melodic contour pattern, each group providing information for specifying the destination of a received call; and generating during said second segment one of a group of second encoded audible tone signals, each signal of the group providing information for specifying the origin of the received call.

13. The method of encoding an audible ringing signal as in claim 12 wherein each of the first encoded audible tone signals comprises a pulse of one of multiple frequency audible tone signals, each of said tone signals having a common pulse width.

14. The method of encoding an audible ringing signal as in claim 13 further including the step of syncopating each one of the group of second encoded audible tone signals to the melodic contour pattern.

15. The method of encoding an audible ringing signal as in claim 14 wherein each of the second encoded audible tone signals comprises at least one of multiple pulses of a single frequency audible tone signal, each tone signal having a common pulse width.

16. The method of encoding an audible ringing signal as in claim 12 further including the step of generating the second encoded audible tone signals such that each signal has a unique number of pulses of a single frequency.

17. The method of encoding an audible ringing signal as in claim 16 further including the steps of dividing the second segment into multiple subsegments, and including the number of pulses of a second encoded audible tone signal in selected subsegments and no signal in nonselected subsegments.

18. The method of encoding an audible ringing signal as in claim 17 wherein the second segment is comprised entirely of nonselected subsegments.

19. A method of encoding an audible ringing signal of a communication system, said method comprising the steps of:

dividing an active ring interval of an audible ringing signal into a first and a second segment;

generating during said first segment one of multiple groups of first encoded audible tone signals, each group being arranged in a melodic contour pattern for providing information of a first type about a received call; and generating during said second segment one of a group of second encoded audible tone signals, each signal of the group being syncopated to the melodic contour pattern for providing information of a second type about the received call.

20. The method of encoding an audible ringing signal as in claim 19 wherein said first type of information specifies the destination of said received call.

21. The method of encoding an audible ringing signal as in claim 19 wherein said second type of information specifies the origin of said received call.

22. The method of encoding an audible ringing signal as in claim 19 wherein said second type of information specifies the priority of said received call.

* * * * *